(12) United States Patent
Kamvar et al.

(10) Patent No.: US 8,250,114 B2
(45) Date of Patent: *Aug. 21, 2012

(54) METHOD FOR DETECTING LINK SPAM IN HYPERLINKED DATABASES

(75) Inventors: Sepandar D. Kamvar, Palo Alto, CA (US); Taher H. Haveliwala, Mountain View, CA (US); Glen M. Jeh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/149,806

(22) Filed: May 31, 2011

(65) Prior Publication Data

US 2011/0270890 A1 Nov. 3, 2011

Related U.S. Application Data

(63) Continuation of application No. 12/410,381, filed on Mar. 24, 2009, now Pat. No. 7,953,763, which is a continuation of application No. 10/921,381, filed on Aug. 18, 2004, now Pat. No. 7,509,344.

(60) Provisional application No. 60/496,125, filed on Aug. 18, 2003.

(51) Int. Cl.
G06F 7/00 (2006.01)
G06F 17/30 (2006.01)

(52) U.S. Cl. ...................................... 707/802

(58) Field of Classification Search .......... 707/600–831; 709/215, 218
See application file for complete search history.

(56) References Cited

U.S. PATENT DOCUMENTS

| | | | |
|---|---|---|---|
| 6,285,999 B1 | 9/2001 | Page | 707/5 |
| 6,560,600 B1 | 5/2003 | Broder | 707/7 |
| 6,671,711 B1 | 12/2003 | Pirolli et al. | 709/200 |
| 7,028,029 B2 | 4/2006 | Kamvar et al. | 707/5 |
| 7,216,123 B2 | 5/2007 | Kamvar et al. | 707/5 |
| 7,509,344 B1 | 3/2009 | Kamvar et al. | 707/104.1 |
| 7,953,763 B2* | 5/2011 | Kamvar et al. | 707/802 |
| 2005/0033742 A1 | 2/2005 | Kamvar et al. | 707/7 |

OTHER PUBLICATIONS

Miyamoto et al., directed graph representations of association structure: a systematic approach, Jan./Feb. 1986, IEEE, vol. SMC-16, 53-61.*

Brin, S., et al., "The Anatomy of a Large-Scale Hypertextual Web Search Engine," Computer Networks and ISDN Systems, vol. 30, Issue 1-7, Apr. 1998, pp. 107-117.

(Continued)

*Primary Examiner* — Jean B Fleurantin
(74) *Attorney, Agent, or Firm* — Morgan, Lewis & Bockius LLP

(57) ABSTRACT

A computer-implemented method identifies nodes that are beneficiaries of node importance inflating links in a directed graph of linked nodes. The directed graph of linked nodes corresponds to a linked database, and the nodes correspond to documents within the linked database. The method is performed by a computer system including one or more processors and memory storing one or more programs, the one or more processors executing the one or more programs to perform the method. The method includes computing, for each of at least a subset of the nodes in the directed graph, a respective quantity corresponding to a mathematical derivative of a node importance function, and performing a remedial action on a respective node in the directed graph in accordance with the respective computed quantity computed for the respective node.

24 Claims, 6 Drawing Sheets

OTHER PUBLICATIONS

Page, L., et al., "The PageRank Citation Ranking: Bringing Order to the Web," Jan. 29, 1998, pp. 1-17.

Soudararajan et al., "An In-depth Study of Graph Partitioning Measures for Perceptual Organization," IEEE, vol. 25, No. 6, Jun. 2003, pp. 642-660.

MacGregor et al., "Connectability: A Performance Metric for Reconfigurable Transport Networks," IEEE, vol. 11, No. 9, Nov. 1993, pp. 1461-1469.

Wu, S., et al., "Directed graph based association algebra for object-oriented databases," IEEE, Aug. 6, 2022, 53-59.

\* cited by examiner

METHOD FOR DETECTING LINK SPAM IN HYPERLINKED DATABASES

RELATED APPLICATIONS

This application is a continuation of U.S. patent application Ser. No. 12/410,381, filed Mar. 24, 2009, now U.S. Pat. No. 7,953,763, which is a continuation of U.S. patent application Ser. No. 10/921,381, filed Aug. 18, 2004, now U.S. Pat. No. 7,509,344, which claims prior to U.S. Provisional Patent Application No. 60/496,125, filed Aug. 18, 2003, which are incorporated by reference herein in their entirety.

TECHNICAL FIELD

This invention relates generally to improved techniques for analyzing large linked databases having the structure of directed graphs. More specifically, it relates to methods for facilitating the identification of nodes in such graphs whose surrounding link structure may have been manipulated to artificially inflate the rank of the node as determined by a link-based node ranking scheme.

BACKGROUND

A search engine is a software program designed to help a user access files stored on a computer, for example on the World Wide Web (WWW), by allowing the user to ask for documents meeting certain criteria (e.g., those containing a given word, a set of words, or a phrase) and retrieving files that match those criteria. Web search engines work by storing information about a large number of web pages (hereinafter also referred to as "pages" or "documents"), which they retrieve from the WWW. These documents are retrieved by a web crawler or spider, which is an automated web browser which follows every link it encounters in a crawled document. The contents of each document are indexed, thereby adding data concerning the words or terms in the document to an index database for use in responding to queries. Some search engines, also store all or part of the document itself, in addition to the index entries. When a user makes a search query having one or more terms, the search engine searches the index for documents that satisfy the query, and provides a listing of matching documents, typically including for each listed document the URL, the title of the document, and in some search engines a portion of document's text deemed relevant to the query. In many instances the list of matching documents is ordered by a ranking, or importance value of the document determined, in part, on how the documents link to each other.

More generally, a linked database is a database of documents containing mutual citations. Examples of linked databases include the world wide web or other hypermedia archive, the database of US patents, and a database of academic journal articles. A linked database can be represented as a directed graph of N nodes, where each node corresponds to a document in the database and where the directed connections between nodes correspond to the links, citations, or references from one document to another.

It can be useful for various purposes to rank or assign importance values to nodes in a large linked database. For example, the relevance of database search results can be improved by sorting the retrieved nodes according to their ranks, and presenting the most important, highly ranked nodes first. One approach to ranking documents involves examining the intrinsic content of each document or the back-link anchor text in parents of each document. This approach can be computationally intensive and often fails to assign highest ranks to the most important documents. Another approach to ranking involves examining the extrinsic relationships between documents, i.e., from the link structure of the directed graph. This type of approach is called a link-based ranking For example, U.S. Pat. No. 6,285,999 to Page discloses a technique used by the Google search engine for assigning a rank to each document in a hypertext database. According to the link-based ranking method of Page, the rank of a node is recursively defined as a function of the ranks of its parent nodes. Looked at another way, the rank of a node is the steady-state probability that an arbitrarily long random walk through the network will end up at the given node. Thus, a node will tend to have a high rank if it has many parents, or if its parents have high rank.

A problem with known link-based ranking methods is that the link structure surrounding a node can be deliberately modified to artificially inflate the rank of the node. Consequently, the ranking results of current link-based ranking methods are susceptible to indirect manipulation and distortion. It would be desirable to identify and eliminate or reduce the effects of certain techniques to artificially inflate the ranks of nodes.

SUMMARY

According to some embodiments, a method for identifying nodes that are beneficiaries of node importance inflating links in a directed graph of linked nodes includes computing, for each of at least a subset of the nodes in the directed graph, a respective quantity corresponding to a derivative of a node importance function. A remedial action is performed on a respective node in the directed graph in accordance with the respective computed quantity computed for the respective node.

According to some embodiments, a method for ordering nodes in a directed graph of linked nodes includes computing, for each of at least a portion of the nodes in the direct graph, a respective quantity for the respective node corresponding to a derivative of a node importance function. A subset of the portion is ordered in accordance with the respective quantities.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings. Like reference numerals refer to corresponding parts throughout the several views of the drawings.

DESCRIPTION OF EMBODIMENTS

Figure 1:
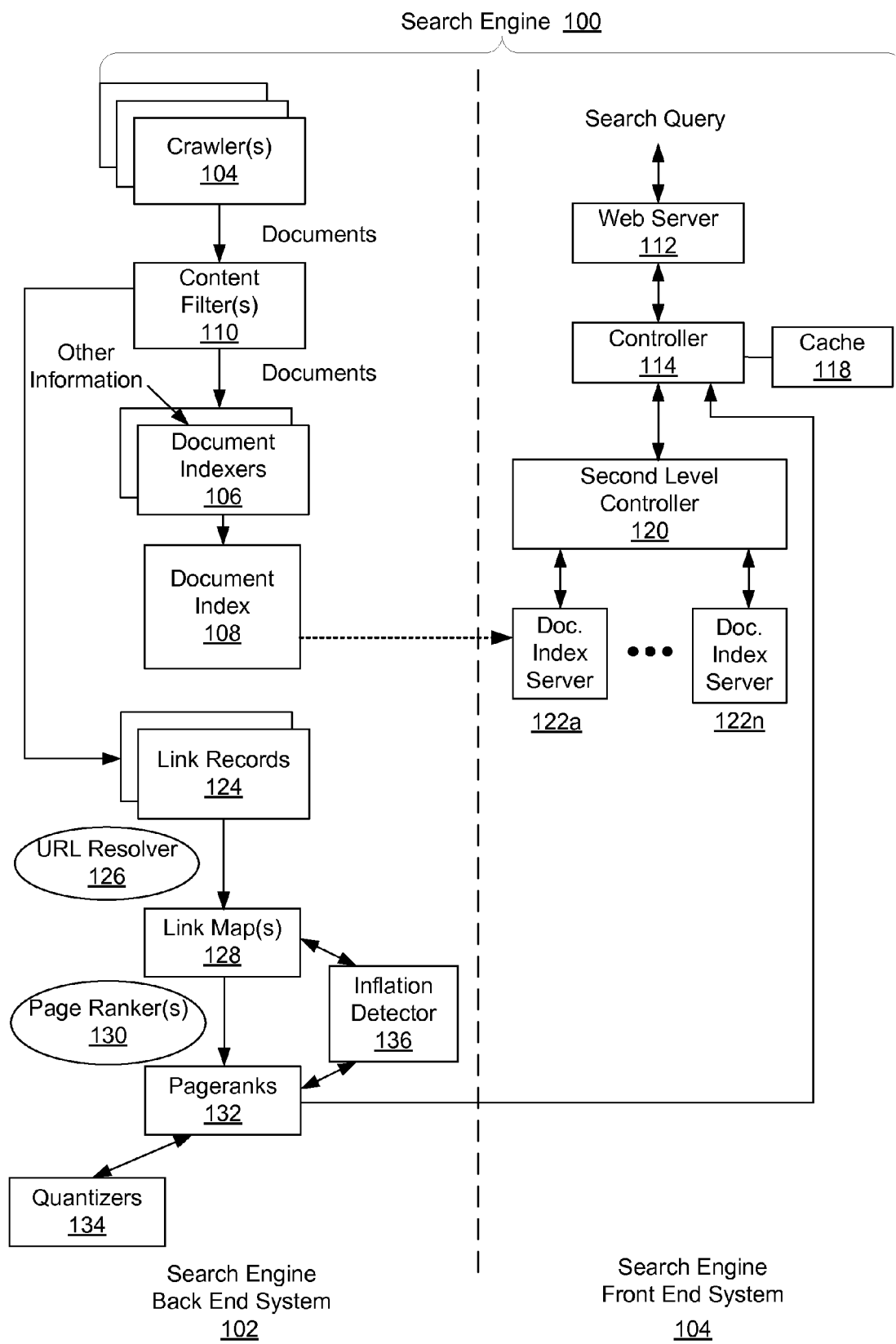
FIG. 1 is a block diagram of a search engine having a back end system and a front end systems in accordance with an embodiment of the present invention.

The techniques of the present invention may used in a search engine environment where the linked database is generated from crawling a number of documents, such as the Internet. FIG. 1 is a block diagram of one such typical search engine environment. As illustrated in FIG. 1, a search engine 100 has a back end system 102 and a front end system 104. The layout of the search engine system 100 is merely exemplary and can take on any other suitable layout or configuration.

The back end system 102 generally includes one or more crawlers 104 (also known as spiders), one or more document indexers 106 and a document index 108. To index the large number of Web pages that exist on the worldwide web, the web crawler 104 locates and downloads web pages and other information (hereinafter also referred to as "documents"). In some embodiments, a set of content filters 110 identify and filter out duplicate documents, and determine which documents should be sent to the document indexers 106 for indexing. The document indexers 106 process the downloaded documents, creating a document index 108 of terms found in those documents. If a document changes, then the document index 108 is updated with new information. Until a document is indexed, it is generally not available to users of the search engine 100.

The front end system 104 generally includes a web server 112, a controller 114, a cache 118, a second level controller 120 and one or more document index servers 122a, ..., 122n. The document index 108 is created by the search engine 100 and is used to identify documents that contain one or more terms in a search query. To search for documents on a particular subject, a user enters or otherwise specifies a search query, which includes one or more terms and operators (e.g., Boolean operators, positional operators, parentheses, etc.), and submits the search query to the search engine 100 using the web server 112.

The controller 114 is coupled to the web server 112 and the cache 118. The cache 118 is used to speed up searches by temporarily storing previously located search results. In some embodiments, the cache 118 includes both high speed memory and disk storage for storing cache search results. In some embodiments, the cache 118 is distributed over multiple cache servers. Furthermore, in some embodiments, the data (search results) in the cache 118 is replicated in a parallel set of cache servers. Providing more than one copy of the cache data provides both fault tolerance and improved throughput for quickly retrieving search results generated during a previous search in response to the search query.

The controller 114 is coupled to a second level controller 120 which communicates with one or more document index servers 122a, ..., 122n. the document index servers 122a, ..., 122n encode the query into an expression that is used to search the document index 108 to identify documents that contain the terms specified by the search query. In some embodiments, the document index servers 122 search respective partitions of the document index 108 generated by the back end system 102 and return their results to the second level controller 120. The second level controller 120 combines the search results received from the document index servers 122a, ..., 122n, removes duplicate results (if any), and forwards those results to the controller 114. In some embodiments, there are multiple second level controllers 120 that operate in parallel to search different partitions of document index 108, each second level controller 120 having a respective set of document index servers 122 to search respective sub-partitions of document index 108. In such embodiments, the controller 114 distributes the search query to the multiple second level controllers 120 and combines search results received from the second level controllers 120. The controller 114 also stores the query and search results in the cache 118, and passes the search results to the web server 112. A list of documents that satisfy the query is presented to the user via the web server 112.

In some embodiments, the content filters 110, or an associated set of servers or processes, identify all the links in every web page produced by the crawlers 104 and store information about those links in a set of link records 124. The link records 124 indicate both the source URL and the target URL of each link, and may optionally contain other information as well, such as the "anchor text" associated with the link. A URL Resolver 126 reads the link records 124 and generates a database 128 of links, also called link maps, which include pairs of URLs or other web page document identifiers. In some embodiments, the links database 128 is used by a set of one or more Page Rankers 130 to compute PageRanks 132 for all the documents downloaded by the crawlers. These PageRanks 132 are then used by Controller 114 to rank the documents returned from a query of document index 108 by document index servers 122. In certain embodiments of the present invention, the back end system 102 further comprises quantizers 134 that are used to quantize data in PageRanks 132. Brin and Page, "The Anatomy of a Large-Scale Hypertextual Search Engine," 7th International World Wide Web Conference, Brisbane, Australia, which is hereby incorporated by reference in its entirety, provides more details on how a PageRank metric can be computed.

In some embodiments an inflation detector 136 examines the link maps 128 to examine whether any nodes might be subject to artificial link inflation. In some embodiments, the inflation detector 136 uses the PageRanks 132 in making such a determination. In some embodiments, the inflation detector 136 may alter the PageRanks 132 or the link maps 128 as a result of detecting inflated nodes.

Although the following exemplary discussion uses a set of linked documents generated from a search engine crawl, the linked nodes could be generated from a variety of sources. For example, the directed graph linked nodes could be generated from linked electronic hypertext documents, journal articles citing each other, patents citing other patents, newsgroup postings, email messages, and social networks such as Friendster, peer-to-peer networks, etc. Furthermore, the term document as used herein could represent any number of items such as audio files and media files, for example. One of ordinary skill in the part would recognize various other types of information which could produce a directed graph of linked nodes as well as other types of documents.

Figure 2:
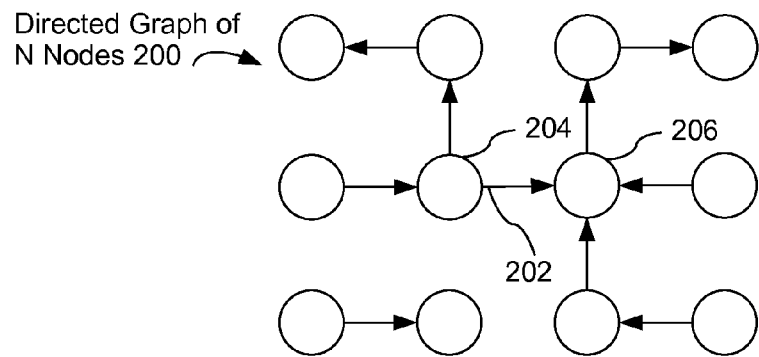
FIG. 2 illustrates a linked node graph in accordance with an embodiment of the present invention.

A typical linked database can be represented as a directed graph of N nodes 200, as illustrated in FIG. 2, where each node corresponds to a document in the database and where the directed connections between nodes correspond to the links, citations, or references from one document to another. For example, in FIG. 2 directed connection 202 is a link from node 204 to node 206. A given node has a (possibly empty) set of forward links that connect it to children nodes, and a (possibly empty) set of backward links that connect it to parent nodes. For example, link 202 is a backward link of node 206 and a forward link of node 204. Thus, node 206 is a child of node 204, and node 204 is a parent of node 206.

Figure 3:
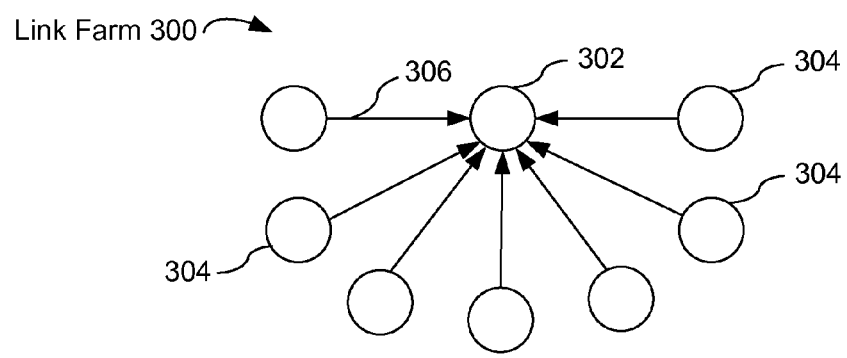
FIG. 3 illustrates a link farm in accordance with an embodiment of the present invention.
Figure 4:
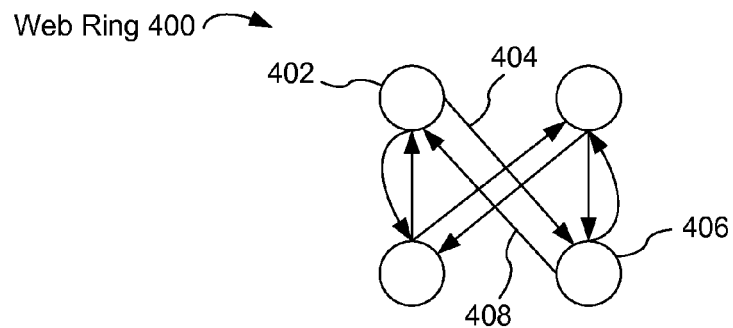
FIG. 4 illustrates a web ring in accordance with an embodiment of the present invention.

Deliberate manipulation of the link structure in the linked database in attempt to inflate the rank of a node or set of nodes is generally called link spamming. For example, current link-based ranking methods are susceptible to at least two types of link spam: "link farms" and "clique attacks". A link farm may be defined to be a set of nodes where a large number of nodes point to a single node in order to give the false impression that the single node is important. For example, FIG. 3 illustrates a link farm 300 in which the rank assigned to a home page 302 of a commercial web site, for example, is artificially increased by creating many dummy web documents 304 that all have links 306 to the home page 302. If the link farm is successful at inflating the rank of home page 302, the commercial web site will appear artificially closer to the top of search results that are presented with higher ranking sites first. Another type of link spam is the clique attack, or web ring, which is defined to be a set of nodes that point predominantly to one another to give the false appearance of authority or importance. For example, FIG. 4 illustrates a web ring 400 of four nodes that have conspired to create many mutual links to each other in a deliberate attempt to inflate their ranks Node 402 has a link 404 to node 406, which in turn has a link 408 back to node 400. As illustrated in the figure, there are similar mutual links between the other nodes in the ring. If the web ring is successful at inflating the ranks of the pages, they will appear artificially closer to the top of search results that are presented with higher ranking sites first.

Because link inflation degrades the accuracy of rankings produced by link-based ranking methods, it would be desirable to be able to identify link spam. However, detecting nodes that are participating in link farms or clique attacks is generally a difficult problem in the case of large databases where human inspection of the directed graph is virtually impossible. One reason for the difficulty is that, for example, a typical directed graph for a database will naturally have some structures similar to the structure of a link farm. A naïve approach to detecting link farms would involve checking each node in the entire graph to determine whether it is pointed to by a large number of pages. This approach would fail to distinguish a link farm from an authentic structure involving many nodes linking to a single very important node. In addition, searching the entire graph for such structures is computationally prohibitive for very large databases such as the web.

The above problems associated with some link-based ranking methods may be reduced by analyzing the directed graph associated with the linked database. In particular, though link farms and web rings exist in typical linked databases, a distinction between normally occurring and intentionally inflating structures may be identified according to embodiments of the invention.

To illustrate an example of the possible distinctions, consider again the link farm illustrated in FIG. 3. This structure is characterized by the presence of one central node with many other nodes linking to it. This same structure, however, naturally occurs in linked databases whenever a very important node is linked to by many other nodes. For example, the web site Yahoo.com has many links pointing to it, but it is not a link farm. In the case of natural structures, the nodes linking to the central node tend to have some links with relatively high rank, while in the case of link farms, the nodes linking to the central node all tend to have relatively low rank.

A brute-force search of the network for such structures would be computationally prohibitive, so another would be preferred. Therefore, according to embodiments of the invention, a quantity, a derivative value, is associated with each node. This value can be used to quantify the distinction between link spam and naturally occurring structures similar to link spam.

Figure 5:
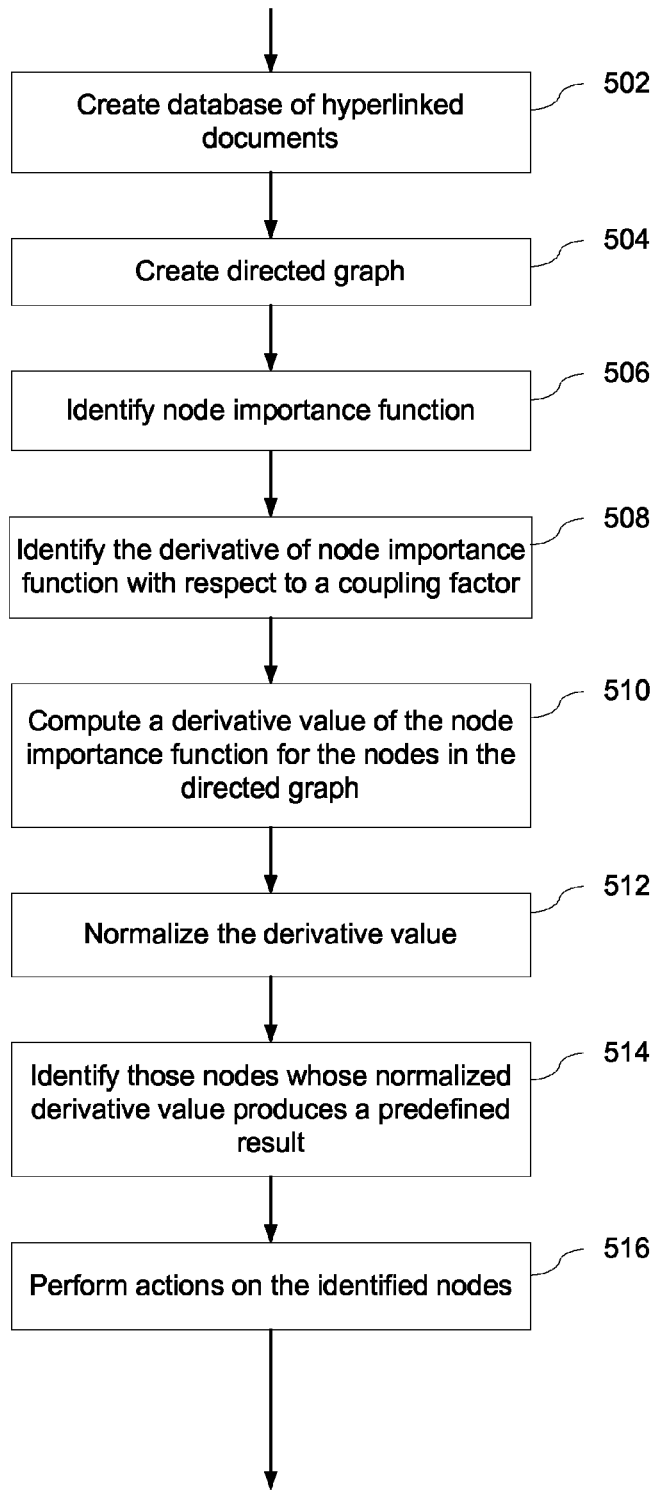
FIG. 5 illustrates a way to identify potential nodes whose importance has been artificially inflated in accordance with an embodiment of the present invention.

In one embodiment, and with reference to FIG. 5, a database of hyperlinked documents is initially created, for example using the link records of FIG. 1 (502). From the database of hyperlinked documents, a directed graph is created (504) which represents the links between the various documents. In one embodiment, this may be represented as a probability transition matrix where the value of $A(j,i)$ represents the probability that a random surfer will jump from node i to node j. A node importance function is identified which is used to compute the importance of the nodes which takes into account the links of the various documents (506). In one embodiment, the node importance function is the PageRank function described earlier. In other embodiments, other link-based ranking techniques could also be used. In still other embodiment, non-link based ranking functions can be used. A derivative of this function is then identified with respect to a link coupling factor (508). In one embodiment the link coupling factor ranges, inclusively, from 0 to 1. A lower value of the coupling factor indicates that the links are less coupled according to the directed graph and a higher value indicated that the links are more coupled to the directed graph. For example, when the coupling factor is 0 the nodes are completely decoupled. In this instance, there is complete random jumping from node to node, and all nodes are assigned an equal rank (i.e., all nodes are equally likely to be visited). At the other extreme, when the coupling factor is 1, the nodes are completely coupled. In this instance, there is no decoupling caused by jumping to random nodes, and the nodes will have different ranks. In link-based ranking systems, the rank for a node is dependent on the ranks of all the nodes linking to it. Thus, as the coupling factor varies, the change of the rank of a node will change depending on the ranks of the nodes pointing to it.

For a selected value of the coupling factor the value of the derivative is computed (510). In a link farm, all the nodes pointing to the central node will tend to have very low importance, so the change in importance (i.e., the derivative of the importance function) of the central node (e.g., node 302 or FIG. 3) will be negative. Moreover, since there tend to be many of these low-importance nodes, the change will tend to be sharply negative. For an authentically important node, however, there will be some high-ranked nodes pointing to it in addition to many low-ranked nodes. These effects will tend to cancel each other, and the change in importance will therefore not be so dramatic. In some embodiments the change in importance of a node is normalized by the importance of the node (512), and then an examination of the normalized derivative values is made against a predefined result (514). Nodes whose importance is inflated due to a link farm-type structure tend to produce a normalized derivative of the importance with respect to the coupling factor that is typically quite large and negative in comparison with the same quantity for other nodes in the graph, including similar naturally occurring structures. An analogous analysis of web rings shows that the normalized derivative of the importance with respect to the coupling factor is typically quite large and positive in comparison with the same quantity for other nodes in the graph. In a clique attack, the nodes predominantly link to each other and not to other nodes. As the coupling increases, the importance of nodes in the ring will increase quickly, since the importance values propagated through the ring in determining a steady-sate importance are not dissipated to nodes outside the ring. A naturally occurring structure, in contrast, will tend to have more links to nodes outside the ring, thereby dissipating the importance of mutual reinforcement of the links. Thus, the normalized derivative of the web ring will be quite large and positive in comparison with other nodes in the graph.

The importance factor used for normalization, however, is not necessarily the same importance of the node for which the derivative is taken. For example, the normalization importance factor could be calculated by counting in-links to each node, calculating a principal eigenvector of a link database matrix A, or calculating a singular value decomposition of a link database matrix A, where A is a N×N matrix and element A(j,i) represents a transition probability from node i and node j.

Once the normalized derivative value has been determined, there are various ways to use it based on predefined results to indicate whether the nodes are likely spam links for nodes in a directed graph (514). Once nodes likely to be spam link have been found, various actions can be taken to account for the artificially inflated importance (516). In some embodiments, candidate spam nodes of the link farm variety are identified by selecting a predetermined percentage of nodes that have the lowest normalized derivative values. In other embodiments, candidate spam nodes of the link farm variety are identified by selecting nodes whose normalized derivative values are less than a threshold. Analogously, in other embodiments, candidate spam nodes of the web ring variety are identified by selecting a predetermined percentage of nodes that have the highest normalized derivative values. And, in other embodiments, candidate spam nodes of the web ring variety are identified by selecting nodes whose normalized derivative values are greater than a threshold. In other embodiments, to identify spam nodes of both varieties simultaneously, nodes are identified by selecting a predetermined percentage of nodes that have the largest magnitudes of the normalized derivative value (i.e., |normalized derivative value|). In still other embodiments, nodes are identified by selecting nodes that have the magnitudes of the normalized derivative value greater than a threshold (i.e., nodes where |normalized derivative value|>threshold). In some embodiments, a human or supplementary algorithm may be used to examine the possible link spam nodes to make a final determination of whether or not they are link spam. If a node is determined to be link spam or a candidate link spam, various counter-measures can be taken (516). In some embodiments, the node is eliminated from the graph. In other embodiments, the importance of the node is reduced. In some embodiments, the reduction is a predetermined penalty or a calculated amount, e.g., an amount proportional to the magnitude of the normalized derivative value. In some embodiments, the importance adjustment is applied against a ranking or importance determined by techniques other than a link-based ranking scheme. In other embodiments, the importance adjustment is applied against a ranking or importance determined by techniques in combination with a link-based ranking scheme.

Figure 6:
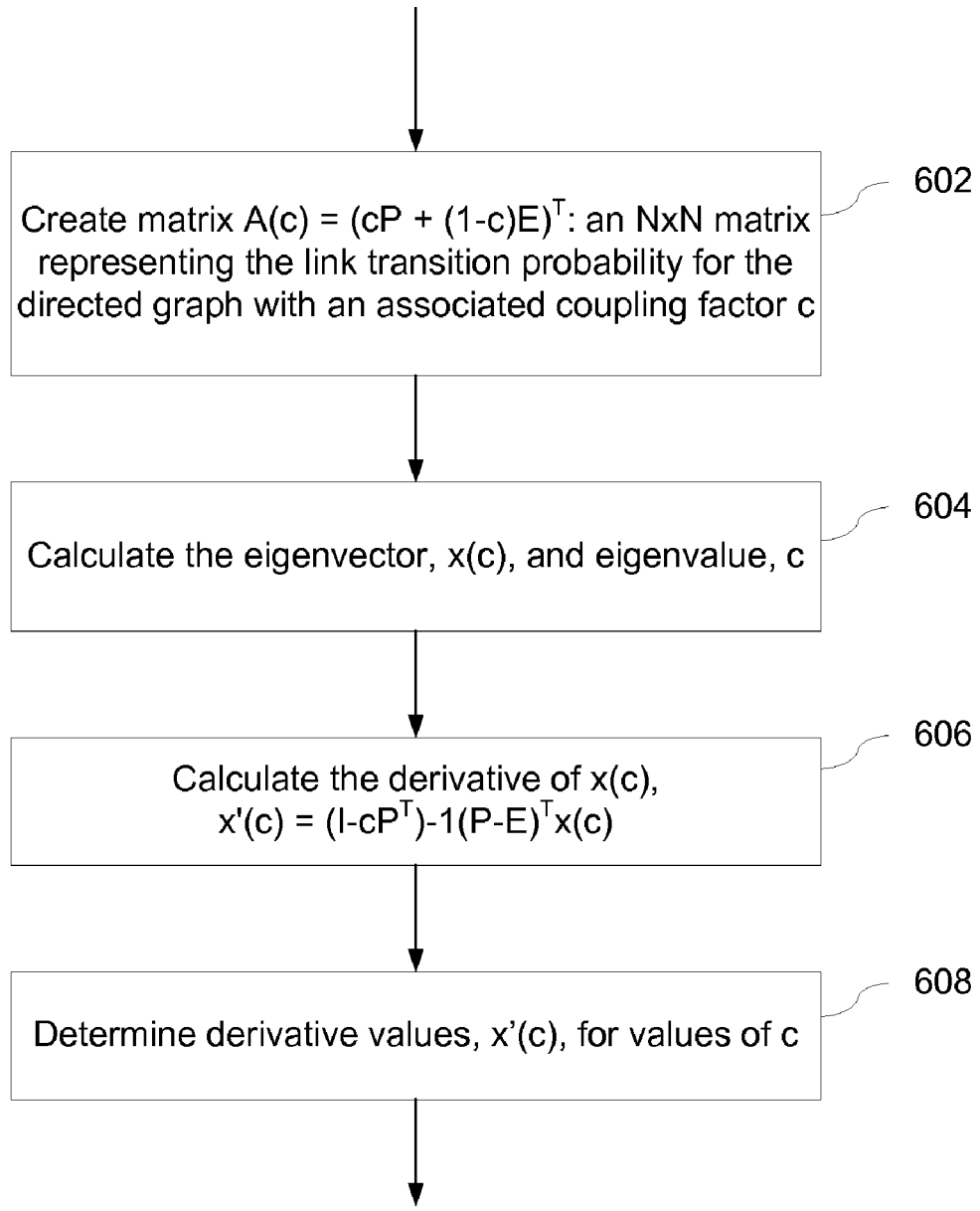
FIG. 6 illustrates in more detail how to calculate the derivative of the importance function in accordance with an embodiment of the present invention.

A more detailed discussion of some embodiments of the calculations used in determining the candidate link spam is provided with reference to FIG. 6. From the directed graph of the hyperlinked nodes, a matrix A(c) is created representing elements in the database that are linked, where $A(c)=[cP+(1-c)E]^T$ (602). The N×N matrix A represents the transition probability structure of the directed graph. The value of the element A(j,i) represents a weight for the link from node i to node j. For example, A(j,i) can be set equal to the fraction of links from node i that connect to node j. More generally, if F is the fraction just mentioned, then A(i,j) can be set equal to $cF+(1-c)/N$, where c ranges inclusively from 0 to 1 and represents a link coupling probability and N is the number of nodes in the graph. In some embodiments, A(i,j) can involve other terms to account for other link effects as well. P is an N×N row-stochastic matrix, where the element A(i,j) represents the probability that a user will jump from i to node j, when a link from i to j exists, otherwise A(i,j) is zero. E is a matrix whose elements A(i,j) represent the probability that a user will randomly jump from node i to j. In some embodiments, all entries in E are equal. In other embodiments, the values of E may take into account a particular user's preferences toward certain documents. For example, if a user frequently jumps to http://www.google.com unrelated to the user's current web page, then the elements could reflect a higher probability that the user will randomly jump from any node to the node representing the www.google.com web page. As c tends toward to 1, the contribution of the random transitions provides less value to A(i,j). Conversely, as the coupling factors tends to zero, the random jump contribution to the transition will increase.

In some embodiments, the importance function is determined by calculating the eigenvector, x(c), and eigenvalue, c, of A(c) (604). The derivative, x'(c), of function x(c) represents the rate of change in the importance value as a function of the coupling factor c. This may be calculated as $x'(c)=(1-cP^T)^{-1}(P-E)^T x(c)$ (606). Various derivative values may be determined by substituting for various values of the coupling factor c (608).

In one embodiment to solve for x'(c), $b=(P-E)^T x(c)$ and $M=I-cP^T$. The solution of $Mx'(c)=b$ for x'(c) would also provide the derivative of the importance function. There are many known algorithms for solving linear systems of equations, but many of them are not practical for solving this system, since the matrix M tends to be very large and sparse, making a factorization (such as LU or QR) prohibitively expensive. In one embodiment, solving this system uses a Jacobi relaxation technique. Jacobi relaxation is a simple iterative splitting algorithm that proceeds as follows: Let $M=D-L-U$, where D is a diagonal matrix, L is a lower triangular matrix with zeros on the diagonal, and U is an upper triangular matrix with zeros on the diagonal. A single iteration of the Jacobi method for solving the system of equations $My=b$ proceeds as follows: $D_y^{(k+1)}=(L+U)_y^{(k)}+b$. As mentioned above, M is provided as $I-cP^T$, where the diagonal entries of $P^T$ are all 0. Therefore, $D=I$ and $L+U=cP^T$. The Jacobi algorithm for this problem would therefore proceed as follows:

```
function x'(c)(n) =ComputeDerivativeValue( ) {
    x'(c)(0) = e;
    b = PTx(c) – ETx(c);
    k = 1;
    repeat
        x'(c)(k) = cPx(k–1) + b;
        δ= ||b –Mx'(c)(k)||;
        k = k + 1;
    until δ <ε;
``` where e is an N×1 matrix having elements equal to 1, and ε is a desired tolerance value used to end the iteration.

The Jacobi algorithm will converge if the first eigenvalue of the matrix $D^{-1}(L+U)$ is less than 1, and the convergence rate of Jacobi relaxation is given by the first eigenvalue:

$$r = \frac{\|y^{(k+1)} - y\|}{\|y^{(k)} - y\|} = \lambda(D^{-1}(L+U))$$

Since $D=I$ and $L+U=cP^T$ as provided above, the convergence rate for this algorithm for D-Values is $r=c$, which tends to be very fast for the values of c anywhere between ($0 \leq c \leq 0.98$). In other embodiments, convergence may also be achieved using Gauss-Seidel techniques to solve $Mx'(c)=b$ for $x'(c)$.

Figure 7:
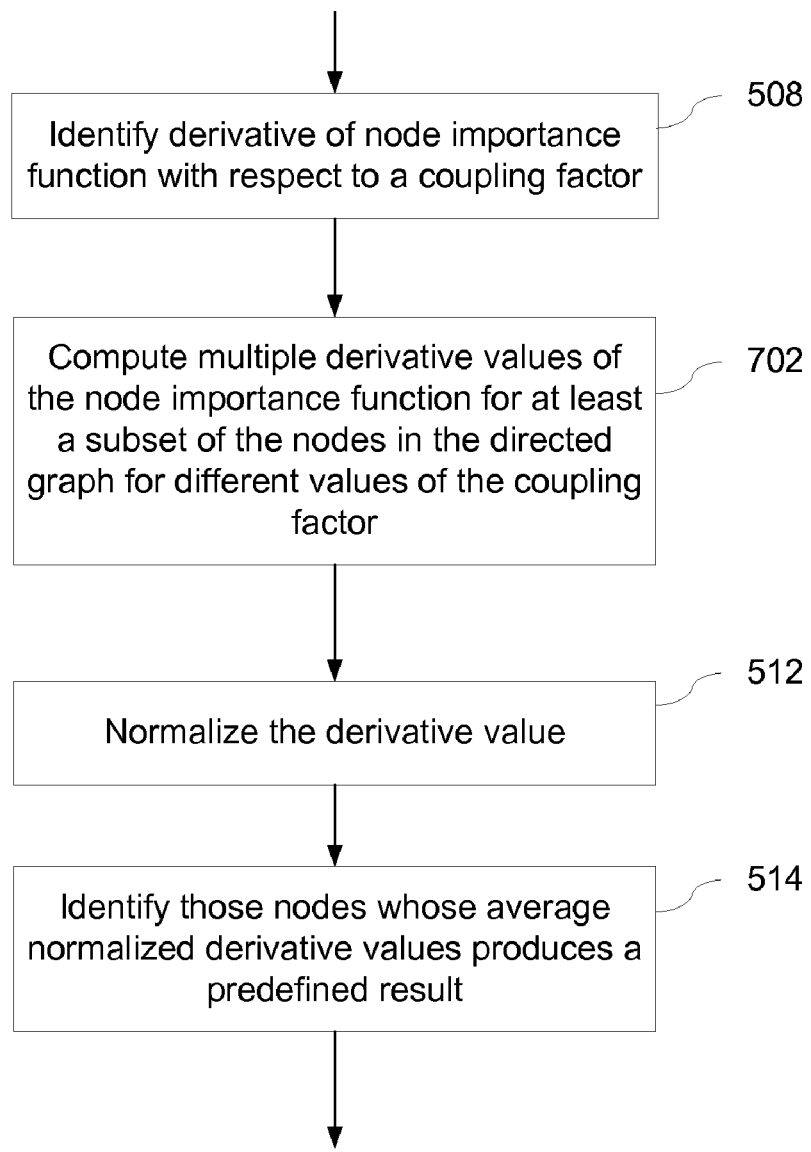
FIG. 7 illustrates calculating multiple derivatives of the importance function in accordance with an embodiment of the present invention.

Referring to FIG. 7, in some embodiments, multiple derivative values are computed for each node using multiple corresponding values for the link coupling parameter c. Since the derivative function may not be uniform over all values, in some embodiments using more than one value of c may produce a better approximate of the change in the importance due to the coupling factor over a wider range. In some embodiments, a final derivative value is computed from a combination of the multiple derivative values using the respective values of c (702). For example, the derivative values for several values of c may be averaged to obtain the final derivative value. In the special case where the derivative value is normalized by the same rank, $x(c)$, of which the derivative value, $x'(c)$, is the derivative, the average of the normalized D-value, $x'(c)/x(c)$, over an interval $[a,b]$ is equal to $\log [x(b)/x(a)]/(b-a)$, or equivalently, $[\log x(b) - \log x(a)]/(b-a)$.

In another embodiment of the invention, the magnitude of the derivative value of a node may be used independently as an estimate of the importance of a node. Thus, irrespective of link spam considerations, the derivative value may be used to assign a rank to a node, and the rank may be used in the same manner as other ranks known in the art, e.g., to sort the results of database searches.

Figure 8:
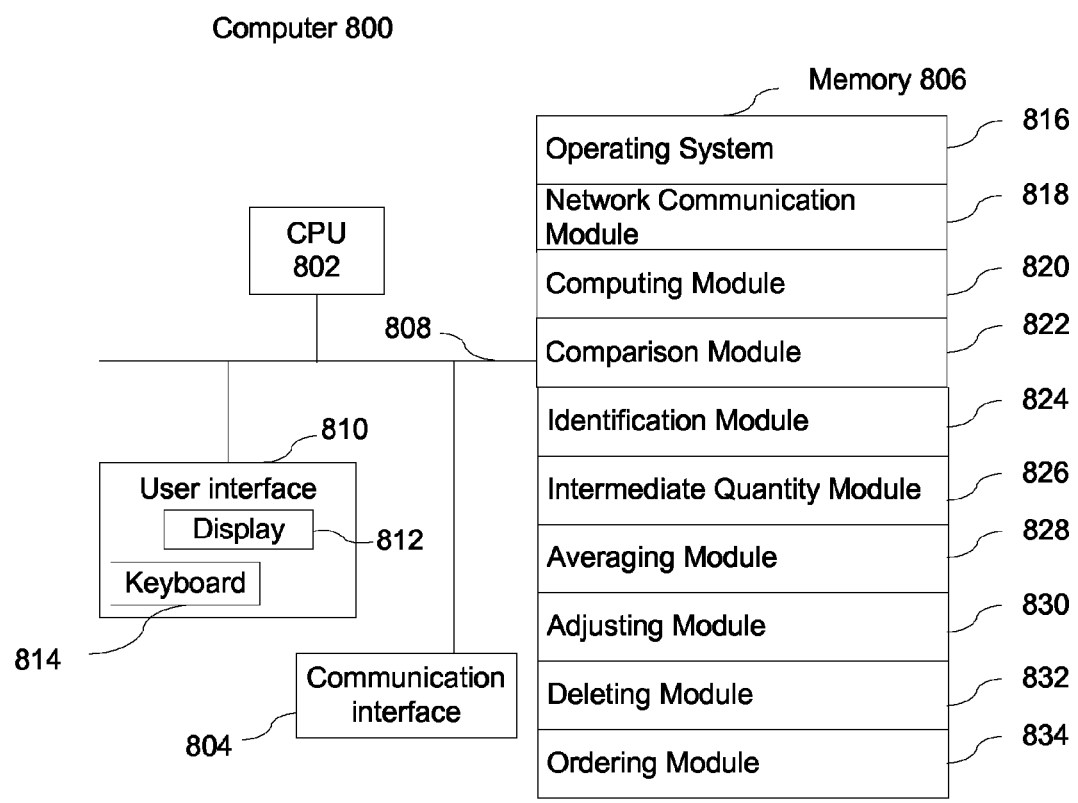
FIG. 8 illustrates a inflation detector in accordance with an embodiment of the present invention.

Referring to FIG. 8, an embodiment of a computer 800 that implements the methods described above includes one or more processing units (CPU's) 802, one or more network or other communications interfaces 804, memory 806, and one or more communication buses 808 for interconnecting these components. The computer 800 may optionally include a user interface 810 comprising a display device 812 (e.g., for displaying system status information) and/or a keyboard 814 (e.g., for entering commands). Memory 806 may include high speed random access memory and may also include non-volatile memory, such as one or more magnetic or optical storage disks. Memory 806 may include mass storage that is remotely located from CPU's 802. The memory 806 may store:

- an operating system 816 that include procedures for handling various basic system services and for performing hardware dependent tasks;
- a network communication module (or instructions) 818 that is used for connecting the computer 800 to other computers via the one or more communications network interfaces 804 (wired or wireless), such as the Internet, other wide area networks, local area networks, metropolitan area networks, and so on;
- a computing module 820 for computing a derivative of a node importance function as described above;
- a comparison module 822 for comparing a computed quantity with a threshold as described above;
- an identification module 824 for identifying nodes which meet certain predefined criteria as describes above;
- an intermediate quantity module 826 for determining multiple derivative values for a node as described above;
- an averaging module 828 for averaging intermediate quantities as described above;
- an adjusting module 830 for adjusting an importance of a node as described above;
- a deleting module 832 for deleting a node from the directed graph as described above; and
- an ordering module 834 for ordering search results based on the normalized derivative value as described above.

Modules 820 through 834 may together comprise an embodiment of the inflation detector 136 (FIG. 1). In some embodiments, these modules, or a subset thereof, are implemented as part of a page ranker (130, FIG. 1) or page importance ranking subsystem.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for analyzing a directed graph of linked nodes, wherein the directed graph of linked nodes corresponds to a linked database, and wherein the nodes correspond to documents within the linked database, the method comprising:
   at a computer system including one or more processors and memory storing one or more programs, the one or more processors executing the one or more programs to perform the operations of:
   identifying nodes that are beneficiaries of node importance inflating links in the directed graph of linked nodes by computing, for each of at least a subset of the nodes in the directed graph, a respective quantity corresponding to a mathematical derivative of a node importance function; and
   performing a remedial action on a respective node in the directed graph in accordance with the respective computed quantity computed for the respective node.

2. The method of claim 1, wherein performing the remedial action includes removing the respective node from the directed graph.

3. The method of claim 1, including normalizing the respective quantity in accordance with a respective rank for the node.

4. The method of claim 1, wherein the computing computes the mathematical derivative of the node importance function with respect to a coupling factor.

5. The method of claim 4, wherein the computing includes:
   computing at least two intermediate quantities of the derivative of the node importance function for each of the set of nodes, each of the intermediate quantities computed using a different respective value of the coupling factor; and averaging the intermediate quantities to produce the computed respective quantity.

6. The method of claim 4, wherein the coupling factor represents how tightly coupled the linked nodes are in the directed graph.

7. The method of claim 4, further including:
generating an adjusted importance for at least one node of the portion.

8. The method of claim 7, wherein the generating adjusts, for the at least one node, the importance by an amount proportional to the respective computed quantity.

9. The method of claim 1, wherein the computing includes:
calculating a matrix A(c) representing the directed graph, the matrix A(c) being an N×N matrix that is a function of a link coupling coefficient c, where N is a number of nodes in the directed graph;
calculating a principal eigenvector of A(c), denoted x(c);
calculating a derivative with respect to c of x(c), denoted x'(c); and
for at least one node, calculating from x'(c) and a rank for the node, an inflation likelihood value S.

10. The method of claim 9, further comprising comparing the inflation likelihood value S with a predetermined spam threshold value.

11. A non-transitory computer readable storage medium storing one or more programs for analyzing a directed graph of linked nodes, wherein the directed graph of linked nodes corresponds to a linked database, and wherein the nodes correspond to documents within the linked database, the one or more programs for execution by one or more processors of a computer system, the one or more programs comprising instructions for:

identifying nodes that are beneficiaries of node importance inflating links in the directed graph of linked nodes by computing, for each of at least a subset of the nodes in the directed graph, a respective quantity corresponding to a mathematical derivative of a node importance function; and performing a remedial action on a respective node in the directed graph in accordance with the respective computed quantity computed for the respective node.

12. The non-transitory computer readable storage medium of claim 11, wherein the instructions for performing the remedial action include instructions for removing the respective node from the directed graph.

13. The non-transitory computer readable storage medium of claim 11, the one or more programs further including instructions for normalizing the respective quantity in accordance with a respective rank for the node.

14. The non-transitory computer readable storage medium of claim 11, wherein the instructions for computing include instructions for computing the derivative of the node importance function with respect to a coupling factor.

15. The non-transitory computer readable storage medium of claim 14, wherein the instructions for computing include instructions for:

computing at least two intermediate quantities of the derivative of the node importance function for each of the set of nodes, each of the intermediate quantities computed using a different respective value of the coupling factor; and averaging the intermediate quantities to produce the computed respective quantity.

16. The non-transitory computer readable storage medium of claim 14, wherein the coupling factor represents how tightly coupled the linked nodes are in the directed graph.

17. The non-transitory computer readable storage medium of claim 11, the one or more programs further including instructions for generating an adjusted importance for at least one node of the portion.

18. A system for analyzing a directed graph of linked nodes, the system comprising:
memory;
one or more processors;
one or more programs stored in the memory and configured for execution by the one or more processors, the one or more programs including instructions which, when executed by the one or more processors, cause the system to:
identify nodes that are beneficiaries of node importance inflating links in the directed graph of linked nodes by computing, for each of at least a subset of the nodes in the directed graph, a respective quantity corresponding to a mathematical derivative of a node importance function; and
perform a remedial action on a respective node in the directed graph in accordance with the respective computed quantity computed for the respective node.

19. The system of claim 18, wherein performing the remedial action includes removing the respective node from the directed graph.

20. The system of claim 18, the one or more programs further including instructions which cause the system to normalize the respective quantity in accordance with a respective rank for the node.

21. The system of claim 18, wherein computing includes instructions for computing the derivative of the node importance function with respect to a coupling factor.

22. The system of claim 21, wherein the instructions for computing includes instructions which cause the system to:
compute at least two intermediate quantities of the derivative of the node importance function for each of the set of nodes, each of the intermediate quantities computed using a different respective value of the coupling factor; and
average the intermediate quantities to produce the computed respective quantity.

23. The system of claim 21, wherein the coupling factor represents how tightly coupled the linked nodes are in the directed graph.

24. The system of claim 18, the one or more programs further including instructions which cause the system to generate an adjusted importance for at least one node of the portion.

* * * * *